Nov. 4, 1958  J. H. H. VAN DER LANS  2,858,556
SELF-PROPELLED SEWER PIPE CLEANING APPARATUS
Filed Nov. 2, 1956

INVENTOR
JOHANNES HUBERTUS
HENDRIKUS VAN DER LANS
BY Irwin S. Thompson
ATTY.

United States Patent Office 2,858,556
Patented Nov. 4, 1958

2,858,556

SELF-PROPELLED SEWER PIPE CLEANING APPARATUS

Johannes Hubertus Hendrikus van der Lans, Sassenheim, Netherlands

Application November 2, 1956, Serial No. 620,115

2 Claims. (Cl. 15—104.3)

The present invention relates to improvements in or connected with a sewer pipe cleaning apparatus of the kind comprising a frame displaceable on wheels or other supports and dimensioned to fit the sewer pipe to be cleaned with ample clearance, such frame carrying motor driven means for propelling it through said sewer pipe and means, for instance a cable, for retracting it through said pipe. A cleaning apparatus of this kind is known per se.

In this known construction the means for propelling the apparatus through the sewer pipe consist of toothed wheels driven by said motor and arranged to engage the wall of the pipe on either side of the longitudinal centre plane of the apparatus.

This mode of propelling the apparatus through the medium of power driven, sharply toothed wheels has the disadvantage that the sharp teeth are likely to cause damage to said wall and to interfere with the withdrawal of the apparatus through the pipe.

In the case of an occasional jamming of the apparatus within the pipe the wheels are likely to slip and the apparatus cannot continue under its own power, notwithstanding the provision at the front of the machine of scraper wheels driven by a second motor and engaging the pipe wall.

According to the present invention the propelling means exclusively consist of a helically shaped element such as a screw propeller, a helically wound blade operating within a tube, or the like propelling means.

Therefore, if care is taken that there is a sufficient water level in the sewer pipe, the apparatus is moved forward independently of the wall of the pipe in the manner of a vessel or a torpedo, thereby excluding the difficulties encountered with apparatus of the kind shown, as above set forth.

The invention will be hereinafter described with reference to the accompanying drawing, wherein.

Figure 3:
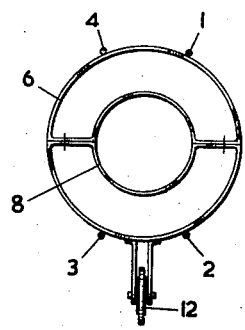
Fig. 3 is a diagrammatic cross-section on the line III—III in Figure 1.

The apparatus shown comprises a frame substantially constituted by four parallel rods 1, 2, 3 and 4 interconnected by annular members 5, 6 and 7. The members 6 and 7 comprise inner rings 8 as shown in Figure 3, said rings supporting the housing 9 of an electro-motor of the type usually employed for so-called under-water-pumps, the motor having a small diameter and being constructed in a waterproof manner. If necessary the motor instead of being exactly axially arranged could also be arranged within the frame at a small angle with the axis.

Figure 1:
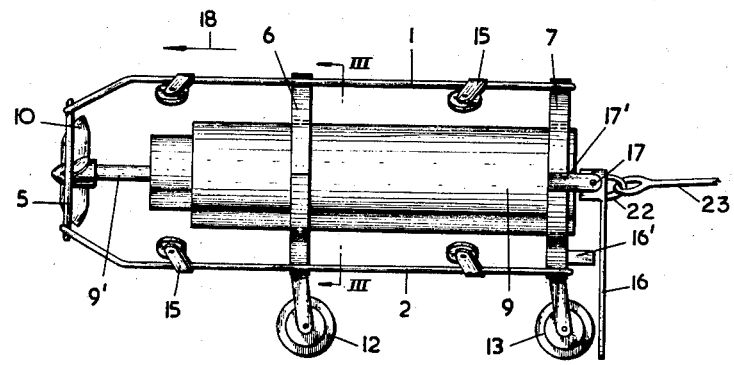
Fig. 1 shows a side elevational view of the apparatus according to the invention.
Figure 2:
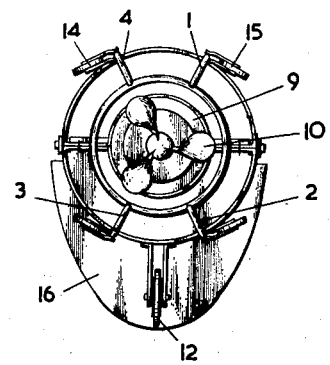
Fig. 2 is a front eelvational view, whilst

In Figures 1 to 3 the shaft 9' of the motor carries a screw propeller 10. The same may be made of bronze and may be in the form of a ship's propeller of small radius.

The apparatus is further provided with rollers 12, 13 for displaceably supporting the apparatus upon the bottom wall of the pipe. In case such rollers would be in the way when the apparatus has to be passed through a vertical shaft into the sewer pipe, the rollers could be removable or adapted to be folded sidewards. For laterally supporting the apparatus against the wall of the pipe rollers 14 and 15 are provided on the frame which, however, could also be replaced by slides or the like elements. For the purpose of retracting the apparatus through the pipe there are provided on the back of the frame means 22 for attaching a cable 23 or the like to said frame for retracting same through the pipe in backward direction.

At the rear of the apparatus there is provided a flap 16 pivotally suspended from an axis 17 mounted in a support 17' projecting from said frame. Upon forward movement of the device, i. e. in the direction of the arrow 18 in Figure 1, said flap 16 will be lifted and therefore will easily follow the apparatus. If, however, the apparatus is backwardly withdrawn through the sewer pipe, the flap 16 will move downwards against an abutment or abutments 16' provided on the frame for preventing clockwise movement of the flap beyond a substantially vertical position. The flap 16 will then act as a scraper for removing the matter loosened by the apparatus during its forward travel, the shape of the flap being adapted to the profile of the sewer pipe. The ring 5 may be provided at its front edge with a cutting bevel.

Figure 4:
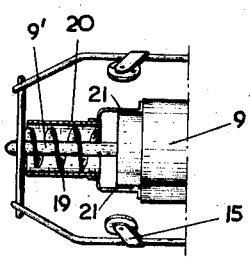
Fig. 4 is a fractional view of the front end of an apparatus comprising an alternative embodiment of said propelling element.

Referring now to the alternative embodiment shown in Figure 4, the helically shaped propelling element consists of a blade 19 helically wound about and attached to the shaft 9' of the motor and surrounded by an open ended tube 20 secured by projections 21 to the housing 9 of the motor.

It will be clear that the invention is not strictly limited to the embodiments shown and described above and that structural variations may be made therein without departing from the scope of the invention as defined in the appending claims.

What I claim is:

1. A sewer pipe cleaning apparatus comprising a skeleton frame comprising peripherally spaced lonigtudinally extending rods and spaced annular rings joined to said rods, support means connected with said frame for engagement with the bottom wall of a sewer, an electric motor carried by said frame centrally thereof, a propeller operatively connected with said motor and disposed in a plane substantially transverse to the longitudinal axis of said frame, means attached to said frame for pulling said frame back through a sewer pipe after propulsion therethrough by said motor and propeller, and a cleaning flap pivoted to said frame about a transverse axis, said flap being free to swing rearwardly upon advance of the frame but bearing against a stop portion of the frame upon withdrawal of the frame so as to be perpendicular to the longitudinal axis of the frame.

2. The apparatus of claim 1, and further comprising a plurality of lateral support rollers carried by said frame, said support rollers lying in planes generally tangential to the annular rings.

References Cited in the file of this patent

UNITED STATES PATENTS

| 202,519 | Chapin | Apr. 16, 1878 |
| 986,462 | Holdaway | Mar. 14, 1911 |
| 1,112,057 | Dudash | Sept. 29, 1914 |

FOREIGN PATENTS

| 69,294 | Denmark | May 30, 1949 |
| 306,377 | Great Britain | Feb. 21, 1929 |